UNITED STATES PATENT OFFICE.

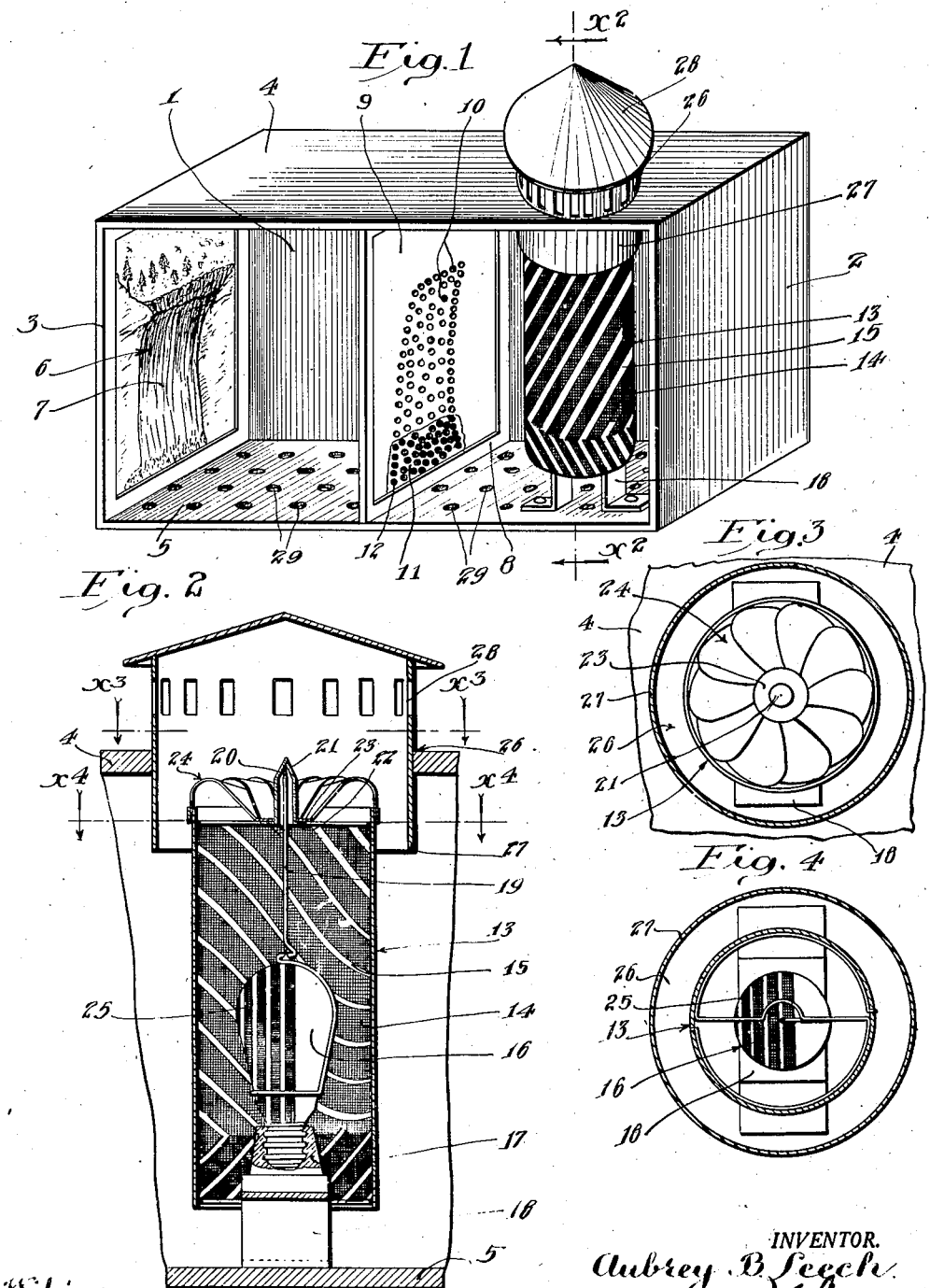

AUBREY B. LEECH, OF LOS ANGELES, CALIFORNIA.

APPARATUS FOR PRODUCING ILLUMINATED MOTION EFFECTS.

1,369,751.   Specification of Letters Patent.   Patented Feb. 22, 1921.

Application filed November 18, 1919. Serial No. 338,802.

*To all whom it may concern:*

Be it known that I, AUBREY B. LEECH, a citizen of the United States, residing at Los Angeles, in the county of Los Angeles and State of California, have invented a new and useful Apparatus for Producing Illuminated Motion Effects, of which the following is a specification.

This invention relates to apparatus for producing illuminated motion effects such, for instance, as rain, snow, fire, smoke, vapor and moving water, and an object of the invention is to produce such effects in a realistic manner in a picture or scene provided for that purpose.

Another object is to provide apparatus of this type in which different effects may be produced and different pictures employed so that a standard construction of apparatus may be used to obtain a large number of different effects.

Other objects and advantages will appear in the subjoined detailed description.

The accompanying drawings illustrate the invention.

Figure 1 is a perspective view of an apparatus built in accordance with the provisions of this invention, one of the side walls being broken away so as to disclose the parts within.

Fig. 2 is an enlarged sectional elevation on line indicated by $x^2-x^2$ Fig. 1.

Fig. 3 is a plan section on line indicated by $x^3-x^3$ Fig. 2.

Fig. 4 is a plan section on line indicated by $x^4-x^4$ Fig. 2.

There is provided a suitable box or chamber comprising side walls 1, end walls 2, 3, top 4, and a bottom 5. The end wall 3 is translucent and is in fact formed of transparent or translucent material adapted to receive color pigments. The end wall 3 may be of any material suited to the purpose, for example, the light transmitting structure disclosed in my co-pending application for patent. On the end wall 3 is painted or otherwise produced a picture or view indicated at 6 and in the particular instance shown in the drawings the principal feature of the picture is a waterfall indicated at 7. The picture shown is merely an example so as to make clear the construction and operation of the invention.

There is shown inside of the box a screen indicated at 8, but it is to be understood that this screen may at times be omitted, if desired, when its use is not essential or desirable to the production of the illuminated motion effect. The screen 8 may have translucent portion 9, and transparent portions 10. These transparent portions are shown in the form of small spots in the drawings, but it is to be understood that the transparent portions may be of any other desired form, for example, spaced bars running in any desired direction. In this particular screen 8 there is also provided near the bottom thereof a transparent portion 11 which is provided with opaque portions 12, in this instance, in the form of spots, though it is understood that the opaque portions may be in the form of bars or of any other suitable shape. The arrangement and formation of the opaque, translucent and transparent portions of the screen 8 may be varied within the skill and judgment of the constructor so as to produce various illuminated effects in the picture 6.

Between the screen 8 and end wall 2 there is provided a moving screen 13, said screen in the instance shown being in the form of a rotatively mounted drum or cylinder. The drum may be circular or of other cross-sectional shape and is provided with opaque portions 14 and transparent portions 15. The portions 14, 15 may be of any suitable shape and arrangement and in the instance shown in the drawings are in the form of bars or bands substantially of helical arrangement. It matters not how the opaque and transparent portions of the screen 13 are formed, but a desirable way of producing the opaque portions is to form the screen 13 of celluloid or other transparent material and then apply opaque paint to the celluloid so as to prevent the transmission of light rays through certain portions of the screen 13.

Within the screen 13 is a source of light 16 such, for example, as an ordinary electric light bulb, said bulb being seated in a socket 17 mounted on a base 18 which may be fastened to the bottom 5 of the box. The bulb 16 supports a wire standard 19 provided with a pointed end 20 on which is a rotatively mounted bearing 21 that may be in the form of a tube constructed of glass or other suitable material. The bearing 21 is provided with a flange 22 which engages the under face of a collar 23 of a horizontal fan, indicated in general by the character 24. Thus the bearing 21 forms the hub of the fan 24. The glass of the bulb 16 may be transparent throughout or, if desired, portions of the bulb may be made opaque by the application of opaque paint. Such opaque portions are indicated at 25, and, in this instance, are in the form of vertical bands or bars.

It is obvious that the heat of the lamp, when energized, causes rotation of the fan 24, thus rotating the screen 13, the heated air passing off through a suitable opening 26 in the top 4 of the box, and the cooler air being admitted through ports 29 in the bottom of the box to displace the heated air. The speed of rotation of the screen 13 is increased by providing the opening 26 with a flue 27 having discharge ports 28. The higher the flue 27 is made the stronger the draft and consequently the greater the speed of the screen 13.

By constructing the screen 13 in the form of a drum as shown, and mounting the fan 24 on the upper end of the cylinder greater speed of the drum 13 is effected than if the fan blades were at the periphery of the drum, and this is of importance, in some instances, where it is desirable to produce a relatively high rate of speed of the transparent portions 15 to represent quick motion as in the falling of water as rain or cataracts. Within certain limits the effect of different speeds of the transparent portions 15 may be secured by increasing or decreasing the spacing of the transparent portions. The closer the portions 15 are to one another the greater the speed effect will be and the farther apart the transparent portions 15 are the slower the speed effect will be. In this instance, the bars 14, 15 on the major portion of the screen 13 are aslant downwardly in the direction of rotation of the screen and at the lower portion of said screen the bars are aslant upwardly in the direction of rotation or, in other words, are at an angle to the upper bars, the fan 24 being constructed to cause the screen 13 to turn to the left in the drawings.

In actual practice the invention operates as follows:

Assuming that the lamp 16 is energized so as to produce light and heat, the ascending column of heated air in the screen 13 passing through the fan 24 rotates the same, thus causing the screen 13 to revolve. Assuming that the screen 13 is provided with the alternating bands 14, 15 and that the screen 8 is constructed as hereinbefore described and that the box is provided with the picture 6, representing a waterfall; the rays from the lamp will be intermittently interrupted by the opaque portions 14 of the rotating screen and the transmitted rays, passing through the transparent portions 15, will pass through some portions of the screen 8.

The bars 14, 15 of the upper portions of the screen are arranged in such fashion and the fan 24 is so constructed, that the apparent movement of the upper bars 15 is downwardly, that is, in Fig. 1, the screen 13 rotates to the left so that as the screen 13 rotates the illuminated areas of the upper portion of the screen 8 move downwardly and the illuminated areas of the lower portion move upwardly. The characteristic band-like form of the light transmitted by the screen 13 is broken up by the screen 8 so that the light rays passing through the transparent portions 10 will strike the waterfall 7 in spots, causing an appearance as of splashing or bubbling upward of the water to give a scintillating or sparkling effect characteristic of agitated sunlit water.

If the picture 6 be of such a nature that it is desired to give the effect of upward travel of smoke, steam or vapor, the bands 14, 15 will be formed on the screen 13 so as to extend in the opposite direction to the arrangement shown in the drawings so that when the screen 13 rotates the bands will be caused to appear to move upwardly toward the upper end of the screen.

It is to be noted that the flue 27 projects into the upper portion of the box and surrounds the upper end of the screen 13. The apparatus will operate if the flue 27 does not surround the upper end of the screen 13 and, in fact, will operate without any flue at all, but by providing the flue the draft is perfected so as to produce higher rotative speed of the screen 13 than is possible with the use of the lamp 16 when the flue is omitted. The bars 25 break up the light into vertical bands before said light passes through the screen 13 and thus still further aid in giving the effect of vertical movement to the light and consequently to the representation of falling water in the picture 6.

Though the screen 13 is shown in the form of a cylinder or drum, it is understood that it is not essential to the operation of the device that it be of such form for it may be in the form of an endless belt which, in effect, is a flattened drum or cylinder. The screen 8 may be omitted, though by employing it a greater variety of effects may be produced since it enables the light to be broken up to a greater extent, so as to prevent the appearance of a band-like shadow moving behind the picture which would of course destroy to some extent the illusory effect sought for.

If desired, the lamp 16 may be used only for illuminating purposes and the screen 13 may be rotated by the application thereto of any suitable driving power in a manner which is readily understood by those versed in the arts pertaining to the rotation of drums and endless belts.

From the foregoing it is seen that the lamp and the rotative screen 13 constitute means to produce a fluctuating light, and that the screen 8 is provided with areas of different degrees of permeability to light rays, the areas indicated by the characters 10 and 11 being more permeable to light rays than the areas 9. The light rays striking through the areas of less permeability illuminate those portions of the picture representing still objects, and the light rays striking through the more permeable areas intermittently illuminate those portions of the picture representing a body in motion. The boundary between the translucent portion 9 and the portion having the transparent spots 10 is of coincident contour with the boundary of that portion of the picture representing a body in motion. The intermittent light falling on the body 7 produces to the eye the effect of motion, and the more or less subdued lighting of that portion of the picture representing still objects makes it possible to see such portions at night without external illumination. If the portions of the picture representing still objects were illuminated from an external source of light the pleasing effect would be lost to a large extent.

The invention is not limited in its broader phases to the exact details of construction shown in the drawings and above described, but also includes such changes and modifications as fall within the spirit and scope of the appended claims.

I claim:

1. In an apparatus for producing illuminated motion effects, means to produce a fluctuating light, a translucent panel having a picture thereon, portions of the picture representing still objects and other portions representing a body in motion, and a screen interposed between the picture and the light producing means and having areas of different degrees of permeability to light rays.

2. In an apparatus for producing illuminated motion effects, a box, a screen movably mounted in the box and having light-transmitting and opaque portions, a source of light illuminating the screen, one end of the box comprising a light-transmitting picture having the representation of a body in motion, and a second screen interposed between the first screen and the picture and provided with areas of different degrees of permeability to light rays.

3. In an apparatus for producing illuminated motion effects, a box, a screen movably mounted in the box and having light-transmitting and opaque portions, and an incandescent lamp to illuminate the screen, the bulb of said lamp having light-transmitting and opaque portions and one end of the box comprising a light-transmitting picture having the representation of a body in motion.

4. In an apparatus for producing illuminated motion effects, a box, a rotative screen in the box having light-transmitting and opaque portions, a source of light illuminating the screen, one end of the box comprising a light-transmitting picture having the representation of a body in motion, and a second screen interposed between the first screen and the picture and provided with areas of different degrees of permeability to light rays.

5. In an apparatus for producing illuminated motion effects, a box, a rotative screen in the box having light-transmitting and opaque portions, a fan operatively connected with the screen to rotate the screen, a flue surrounding the upper end of the screen and projecting through the top of the box, and a lamp beneath the fan adapted to heat the air beneath the fan and to illuminate the screen, one end of the box comprising a light-transmitting picture having the representation of a body in motion.

6. In an apparatus for producing illuminated motion effects, means to produce a fluctuating light, a translucent panel having a picture thereon, portions of the picture representing still objects and other portions representing a body in motion, a screen interposed between the picture and the light producing means and having a translucent portion transmitting light rays to the portion of the picture representing still objects, the screen having a transparent portion transmitting light rays to the portion of the picture representing a body in motion.

7. The method of producing illuminated motion effects, which consists in producing a subdued illumination of portions of a light transmitting picture and causing light and shade to pass over certain other portions of said picture.

8. The method of producing illuminated motion effects, which consists in projecting light rays of less intensity through a portion of a light-transmitting picture representing still objects and projecting a fluctuating light through another portion of the picture representing a body in motion.

Signed at Los Angeles, California, this 5th day of November, 1919.

AUBREY B. LEECH.

Witnesses:
GEORGE H. HILES,
JOSEPH MILLER.